United States Patent
Bahgat et al.

(10) Patent No.: US 9,529,606 B1
(45) Date of Patent: Dec. 27, 2016

(54) AUTOMATED TESTING OF GUI MIRRORING

(71) Applicant: International Business Machines Corporation, Armonk, NY (US)

(72) Inventors: Mohamed Bahgat, Dublin (IE); Mariam Moustafa Reda AbdALLAH El-Tantawi, Giza (EG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/080,617

(22) Filed: Mar. 25, 2016

Related U.S. Application Data

(63) Continuation of application No. 14/748,566, filed on Jun. 24, 2015.

(51) Int. Cl.
*G06F 3/048* (2013.01)
*G06F 9/44* (2006.01)
(Continued)

(52) U.S. Cl.
CPC .............. *G06F 9/4448* (2013.01); *G06F 8/20* (2013.01); *G06F 8/34* (2013.01); *G06F 8/38* (2013.01);
(Continued)

(58) Field of Classification Search
CPC ...... G06F 3/0861; G06F 17/3089; G06F 8/20; G06F 8/34; H04L 67/02
See application file for complete search history.

(56) References Cited

U.S. PATENT DOCUMENTS 6,311,180 B1 * 10/2001 Fogarty ............. G06F 17/30905
707/749
6,844,877 B1 1/2005 Rajkumar et al.
(Continued)

FOREIGN PATENT DOCUMENTS

| EP | 1221650 A3 | 1/2004 |
| GB | 920150043 | 6/2015 |
| GB | 920150043 | 3/2016 |

OTHER PUBLICATIONS

Disclosed Anonymously, "Smart Strategy for User Interface Bi-di mode auto-check," IP.com Electronic Publication: Mar. 24, 2014, IP.com No. 000235717, pp. 1-8.
(Continued)

*Primary Examiner* — Steven Sax
(74) *Attorney, Agent, or Firm* — David Zwick

(57) ABSTRACT

Testing correct mirroring of a GUI. Two GUI specifications are received, a reference GUI specification and a mirrored GUI specification that corresponds to a horizontally mirrored version of the reference GUI specification. For each child element in the reference GUI specification, a start position, width, and width of the parent GUI element are determined from the reference GUI specification; for the corresponding mirrored GUI element, a mirrored start position and a mirrored width are determined from the mirrored GUI specification; and for the mirrored GUI element, a calculated mirrored start position, based on the start position, width, and width of the child GUI element's parent GUI element are determined. If the mirrored start position or the mirrored width is not within a predefined tolerance of the calculated mirrored start position or the width, respectively, the mirrored GUI specification is updated with the calculated mirrored start position or the width, respectively.

1 Claim, 9 Drawing Sheets

(51) Int. Cl.
*G06F 17/22* (2006.01)
*G06F 17/28* (2006.01)
*G06F 17/21* (2006.01)
*H04L 29/08* (2006.01)

(52) U.S. Cl.
CPC ......... *G06F 17/212* (2013.01); *G06F 17/2247* (2013.01); *G06F 17/28* (2013.01); *H04L 67/02* (2013.01)

(56) References Cited

U.S. PATENT DOCUMENTS

| | | | |
|---|---|---|---|
| 7,073,137 B2 | 7/2006 | Hassanin et al. | |
| 7,103,797 B1* | 9/2006 | Wahl | G06F 9/50 711/113 |
| 7,213,230 B2 | 5/2007 | Harel et al. | |
| 8,023,771 B2 | 9/2011 | Northover et al. | |
| 8,196,112 B1* | 6/2012 | Cansizlar | G06F 11/3672 717/116 |
| 8,527,950 B2 | 9/2013 | Berry et al. | |
| 8,667,467 B2 | 3/2014 | Dubey et al. | |
| 8,793,578 B2 | 7/2014 | Mounty et al. | |
| 8,918,760 B2 | 12/2014 | Augustin et al. | |
| 8,922,515 B2 | 12/2014 | Beskrovny et al. | |
| 2002/0010798 A1* | 1/2002 | Ben-Shaul | G06F 17/3089 709/247 |
| 2002/0091510 A1* | 7/2002 | Forrest | G06F 9/4448 704/8 |
| 2002/0105535 A1* | 8/2002 | Wallace | G06F 3/0485 715/719 |
| 2004/0254922 A1* | 12/2004 | Vincent, III | G06F 17/30923 |
| 2005/0187964 A1* | 8/2005 | Nakamura | G06F 17/30985 |
| 2006/0106593 A1 | 5/2006 | Schultz et al. | |
| 2006/0136595 A1* | 6/2006 | Satyavolu | G06F 21/41 709/229 |
| 2007/0061488 A1* | 3/2007 | Alagappan | G06F 17/30905 709/246 |
| 2007/0112714 A1* | 5/2007 | Fairweather | G06F 8/427 706/46 |
| 2008/0177994 A1* | 7/2008 | Mayer | G06F 9/4418 713/2 |
| 2009/0089268 A1* | 4/2009 | Benedikt | G06F 17/30929 |
| 2011/0157028 A1* | 6/2011 | Stallings | G06F 3/04883 345/173 |
| 2011/0173568 A1* | 7/2011 | Royal, Jr. | G07F 9/023 715/825 |
| 2012/0179994 A1* | 7/2012 | Knowlton | G06F 3/04897 715/779 |
| 2012/0192151 A1* | 7/2012 | Parkes | G06F 8/34 717/120 |
| 2013/0247044 A1* | 9/2013 | Bingham | G06F 9/45533 718/1 |
| 2013/0260888 A1* | 10/2013 | Thornton | A63F 13/12 463/42 |
| 2013/0332869 A1 | 12/2013 | Ferry et al. | |
| 2014/0047413 A1* | 2/2014 | Sheive | H04L 65/403 717/110 |
| 2014/0078075 A1* | 3/2014 | Wilensky | G06F 9/4443 345/173 |
| 2014/0081625 A1* | 3/2014 | Wilensky | G06F 17/2785 704/9 |
| 2014/0089827 A1* | 3/2014 | Gu | G06F 9/4448 715/765 |
| 2014/0189547 A1 | 7/2014 | Rummler et al. | |
| 2014/0289700 A1* | 9/2014 | Srinivasaraghavan | G06F 8/34 717/106 |
| 2014/0358889 A1* | 12/2014 | Shmiel | G06F 17/30654 707/710 |
| 2014/0366005 A1 | 12/2014 | Kozhuharov | |
| 2015/0007141 A1 | 1/2015 | Grechanik et al. | |
| 2015/0363301 A1 | 12/2015 | Chen et al. | |
| 2016/0057184 A1* | 2/2016 | O'Brien | H04L 65/4038 709/205 |

OTHER PUBLICATIONS

Disclosed Anonymously, "A Tool for assisting Bidi GUI Mirroring Test," IP.com Electronic Publication: Dec. 5, 2013, IP.com No. 000233269, pp. 1-3.
Khaddam et al., "Adapting UsiXML User Interfaces to Cultural Background," Proc. of 1st Int. Workshop on User Interface Extensible Markup Language UsiXML '2010, Berlin, Jun. 20, 2010), Thales Research and Technology France, Paris, 2010, pp. 163-172.
Pham et al., "Beyond Plain Video Recording of GUI Tests," AST '12 Proceedings of the 7th International Workhop on Automation of Software Test, 2012, pp. 103-109.
Mell et al., "The NIST Definition of Cloud Computing," National Institute of Standards and Technology, U.S. Department of Commerce, Special Publication 800-145, Sep. 2011, pp. 1-7.
IBM, List of IBM Patents or Patent Applications Treated as Related, Appendix P, dated Apr. 21, 2016, 2 pages.
Pending U.S. Appl. 14/748,566, filed Jun. 24, 2015, Entitled: "Automated Testing of GUI Mirroring", p. 1-48.

* cited by examiner (A)

(B)

(A)

(B)

AUTOMATED TESTING OF GUI MIRRORING

BACKGROUND

The present invention relates generally to the field of graphical user interface (GUI) development, and more particularly to computer-automated testing of GUI mirroring.

GUIs support a variety of natural languages in order to target users from around the globe. Supporting different languages requires that a GUI display a language in its normal direction flow. For example, English and French are read from left to right (LTR), while Arabic, Hebrew, and Persian are read from right to left (RTL). User convenience dictates that the layout of a GUI for an RTL language be mirrored with respect to the corresponding LTR layout. GUI mirroring generally involves reflecting the position of GUI elements about a vertical axis passing through the center of the screen. Nested GUI elements will be similarly reflected relative to their containing elements. In addition, the direction flow of text elements may be switched, based on whether the language is LTR or RTL.

GUI elements are those elements used by GUIs to visually represent information stored in a computer. These generally facilitate the use of computer software. Examples of GUI elements are windows, for example, folder windows and message windows; and control elements, or widgets, which facilitate specific user-computer interactions, such as buttons, menus, and text boxes.

To ensure that mirroring is implemented correctly, such implementations are generally tested manually. A human tester may preview a mirrored GUI to check the correct placement of GUI elements and report if any are incorrect. Such manual efforts, which need to be redone each time a change to the GUI design occurs, tend to be time consuming and subjective—small deviations from the correct positions may be easily missed by the naked eye. Moreover, certain device characteristics may cause a GUI to appear different when mirrored on different display devices.

SUMMARY

Embodiments of the present invention disclose a computer-implemented method, computer program product, and system for testing correct mirroring of a GUI. A first GUI specification and a second GUI specification are received. One is designated as a reference GUI and the other is designated as a mirrored GUI specification that corresponds to a horizontally mirrored version of the reference GUI specification. For each child element in the reference GUI specification, a start position, width, and width of the parent GUI element are determined from the reference GUI specification; for the corresponding mirrored GUI element, a mirrored start position and a mirrored width are determined from the mirrored GUI specification; and for the mirrored GUI element, a calculated mirrored start position, based on the start position, the width, and the width of the child GUI element's parent GUI element are determined. If the mirrored start position or the mirrored width is not within a predefined tolerance of the calculated mirrored start position or the width, respectively, the mirrored GUI specification is updated with the calculated mirrored start position or the width, respectively.

DETAILED DESCRIPTION

Figure 1:
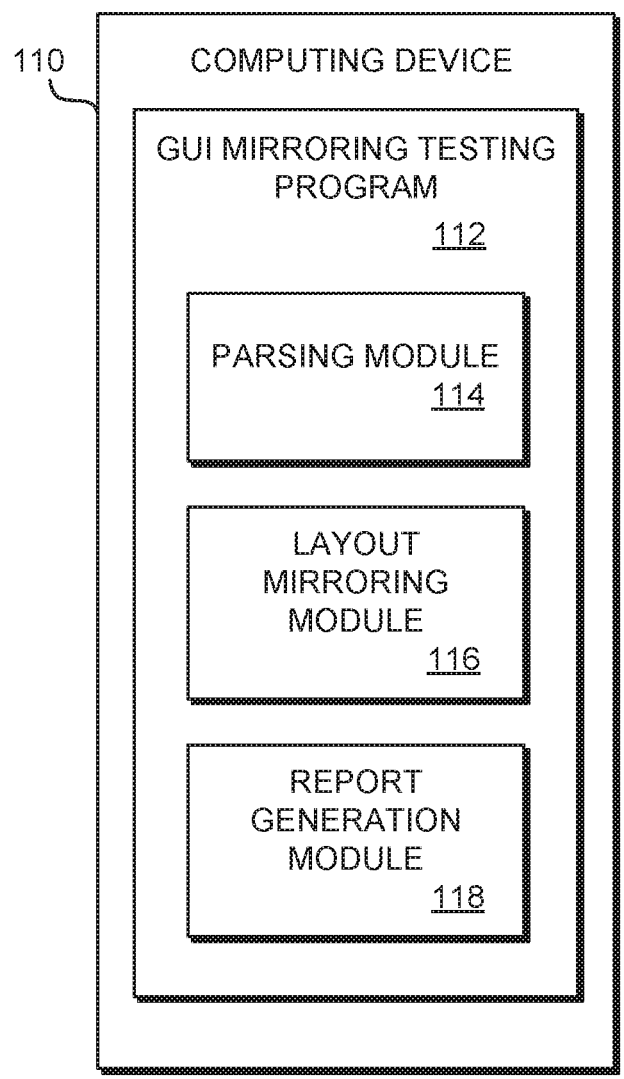
FIG. 1 is a functional block diagram of a GUI mirroring testing (GMT) system, in accordance with an embodiment of the present invention.

Embodiments of the present invention are generally directed to automated GUI mirroring testing (GMT) systems that process layout information for a reference GUI and a corresponding version that is mirrored, or flipped horizontally, to determine whether the positions of mirrored GUI elements, as shown in a display device, will be correct. The positions of mirrored GUI elements are considered to be correct if they satisfy certain positional relationships based on their dimensions and locations. The relationships verify, for example, that GUI element placement will be correct for a language flow direction that is opposite to that of the reference GUI. This enables an automated, accurate, and efficient method for testing GUI mirroring.

For ease of explanation, an exemplary embodiment is described below in which the reference GUI corresponds to an LTR language and the mirrored GUI corresponds to an RTL language. That is, the reference language is LTR and the mirrored language is RTL. It will be apparent to those skilled in the art that the concepts described in relationship to the exemplary embodiment may be applied to embodiments in which the reference GUI is an RTL GUI and the mirrored GUI is an LTR GUI.

Various markup language related trademarks are used throughout this specification. With respect to their use herein, all trademarks and registered trademarks are the property of their respective owners.

Hypertext Markup Language (HTML) is a text-based markup language commonly used to create web pages. Web browsers can read HTML files and render them into visually displayed web pages. HTML5 is the latest revision of the World Wide Web Consortium's (W3C's) HTML standard.

Extensible Markup Language (XML) is a text-based markup language that defines a set of rules for encoding electronic documents in a format which is both human readable and machine readable. It is defined by the W3C's XML 1.0 Specification and by several other related specifications. XML is similar to HTML, however XML was designed primarily to describe data, while HTML was designed to display data.

Extensible Hypertext Markup Language (XHTML) is HTML written according to the stricter rules of XML. As such, XHTML may be parsed using standard XML parsers. HTML5 includes many of the features of XHTML.

Cascading Style Sheets (CSS) is a text-based style sheet language used for describing the look and formatting of a document written in a markup language. While most often used to change the style of web pages and user interfaces written in HTML and XHTML, the language can be applied to any kind of XML document, including plain XML and variants of XML such as XUL™, developed and supported by Mozilla® Foundation. Along with HTML and JavaScript™, CSS is a technology used by most websites to create web pages, user interfaces for web applications, and user interfaces for mobile applications. CSS is designed primarily to enable the separation of document content from document presentation, including design elements such as the layout, colors, and fonts. This separation of content and presentation via CSS is recommended in HTML5.

A desktop application ("desktop app") is a software program that is generally installed on and runs on a desktop computer or laptop. A mobile application ("mobile app") is one that is typically installed on and runs on a mobile device, such as a mobile phone or tablet. A rich Internet application (RIA) is a web application designed to deliver features and functions normally associated with desktop applications; however, an RIA normally runs inside a web browser and usually does not require a software installation. RIAs generally split the processing across the Internet or intranet divide by locating the user interface and related activity on the client side, and the data manipulation and operation on the application server side. HTML5 is designed to work with CSS and JavaScript to facilitate the development of RIAs.

User interfaces for RIAs are often specified similarly to web pages, in text files written in HTML or XHTML, with one or more additional CSS files. User interfaces for desktop and mobile apps are generally specified in text files written in a user interface markup language (UIML), a markup language for describing and rendering GUIs and their control elements. Many UIMLs are dialects of XML and may be dependent on a pre-existing scripting language engine, usually a JavaScript engine, for rendering controls and extra scripting capabilities. Examples of XML-based UIMLs are XUL, QML (Qt® Project), XAML (Microsoft® .NET Framework), and FXML (JavaFX from Oracle®). In addition, the layout of mobile app GUIs for the Android™ platform may be specified in XML.

The W3C Document Object Model (DOM) is a platform and language-neutral interface, or API, that specifies how programs and scripts, for example in JavaScript, may dynamically access and manipulate electronic documents in HTML and XML. The DOM is a W3C standard. The DOM presents an XML or HTML document as a tree-structure. The nodes in the DOM tree of an XML or HTML specification of a GUI layout correspond to nested GUI elements. There is generally one root element, which may correspond to the base window, and multiple child elements, corresponding to controls, or widgets. Typically, each child node has an associated size and position relative to the base window or to its parent element. By traversing the DOM tree, for example using a JavaScript script, the dimensions and positions of GUI elements, as specified, for example, in the XML specification of the GUI layout, may be ascertained and, if desired, modified. An XML parser that supports the XML DOM may also be used to access the elements in a GUI specified via XML.

Tree models other than DOM, such as JDOM and XOM™, may also be used to represent and provide access to GUI elements specified in an XML file. Moreover, languages such as XPath™ and XQuery may facilitate the extraction of data from XML files.

The size and position of GUI elements may be affected by the form and/or pixel density of the device used to display the GUI. For this reason, layout specifications are usually given in relative, or display-independent, units, rather than absolute units such as mm or pixels. Relative units include dp, or density-independent pixels, for Android layouts; px, or device pixel, units in CSS; and gu, or grid units, in QML. Relative units are generally converted to pixels by the program that renders the GUI on the display device. For a GUI layout specified in absolute units, it is generally possible to convert the absolute units to relative units, using characteristics of the display device, such as its size and pixel density.

HTML elements can be considered as boxes. In CSS, the term box model is used when talking about design and layout. The CSS box model is essentially a box that wraps around HTML elements, and it consists of margins, borders, padding, and the actual content, all of which may affect the displayed dimensions of a GUI element. XML documents are not typically formatted with CSS. However, XML-based UIMLs formatted with CSS may provide access to the CSS box model. XML-based UIMLs that support a box model include XUL and QML.

As mentioned, GUI mirroring generally consists of reflecting child GUI elements about a vertical axis passing through the center of the parent GUI element. Typically, only the position of GUI elements is mirrored, not the content. For example, photos will not be flipped, although their order may be reversed. There may be exceptions—for example, some directional icons such as arrows may need to be flipped.

Figure 8:
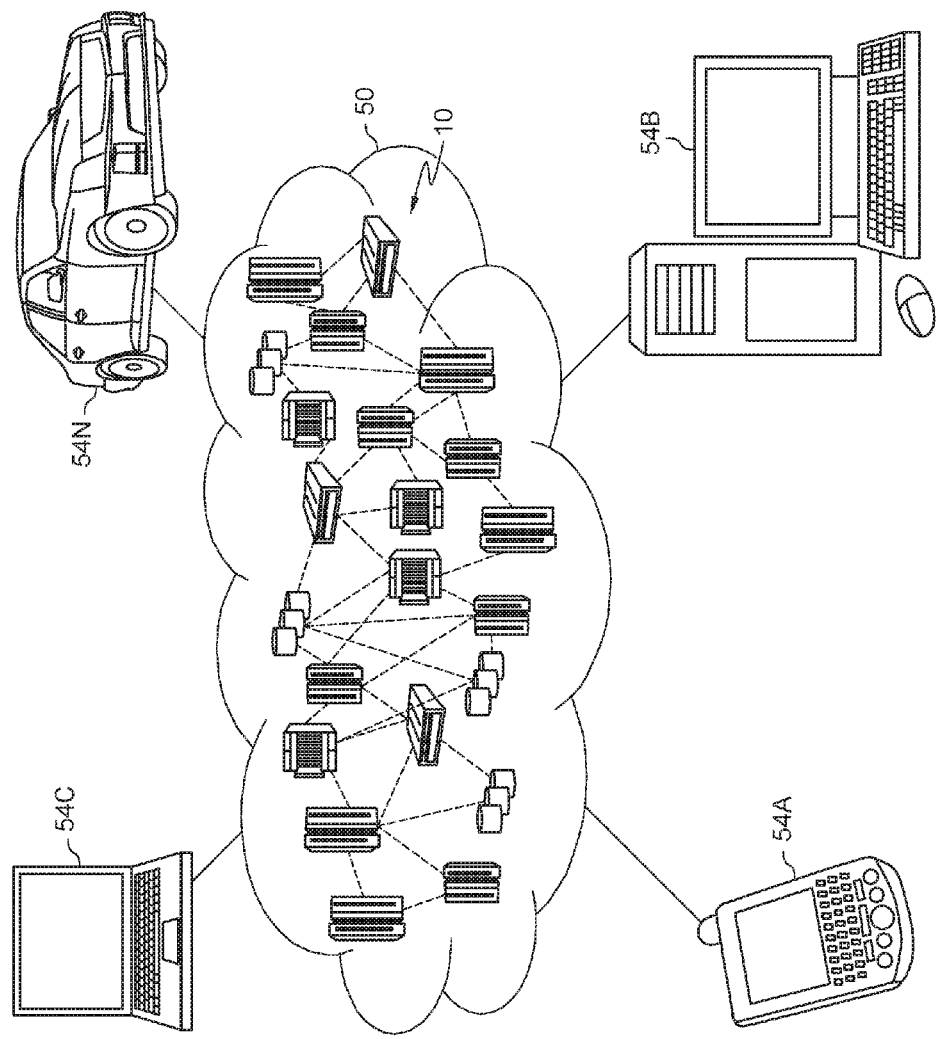
FIG. 8 depicts a cloud computing environment according to an embodiment of the present invention.
Figure 9:
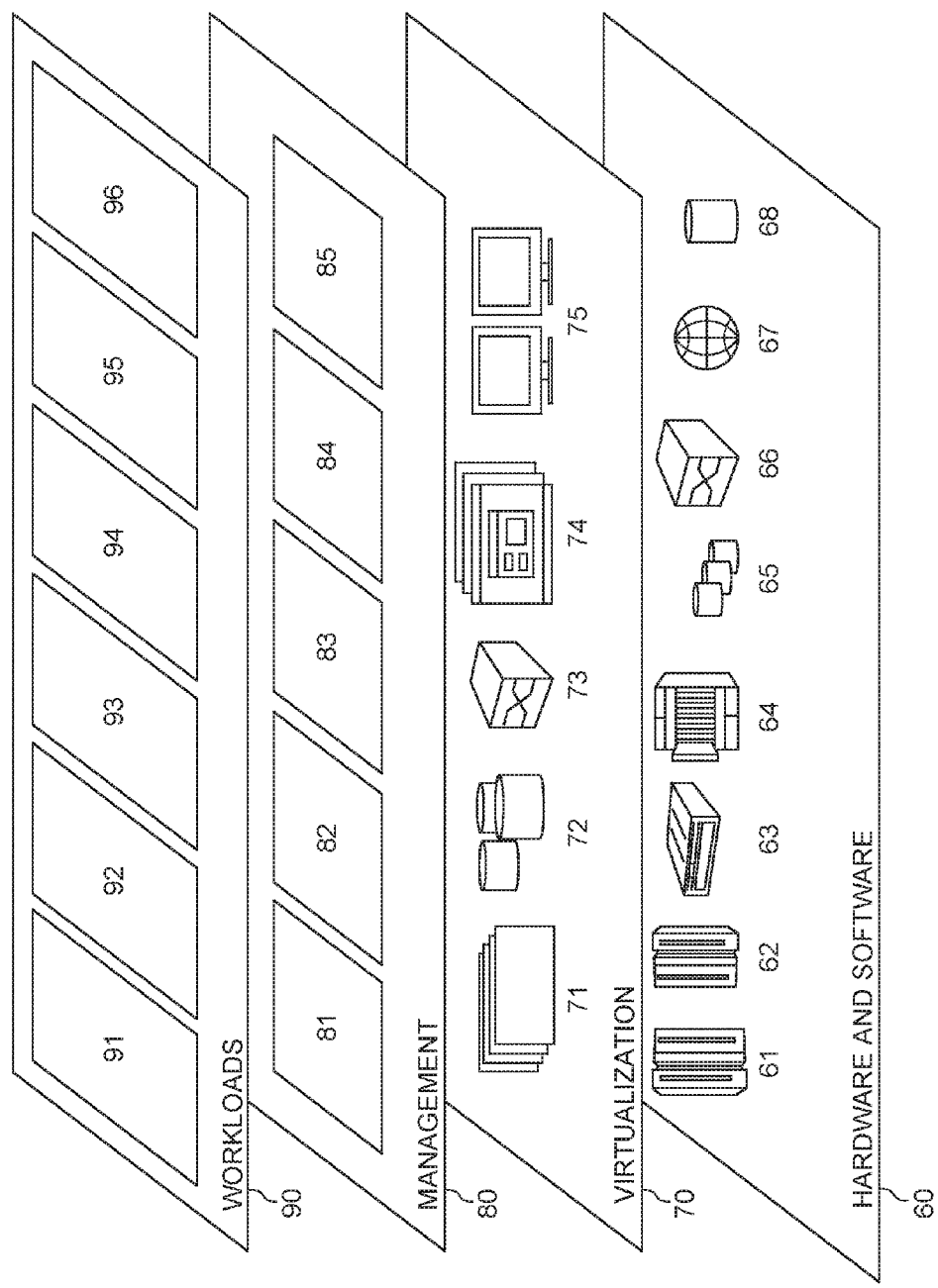
FIG. 9 depicts abstraction model layers according to an embodiment of the present invention.

FIG. 1 is a functional block diagram of a GMT system 100, in accordance with an embodiment of the present invention. GMT system 100 includes computing device 110, which further includes GMT program 112. Computing device 110 represents the computing environment or platform that hosts GMT program 112. In various embodiments, computing device 110 may be a laptop computer, netbook computer, personal computer (PC), a desktop computer, or any programmable electronic device capable of hosting GMT program 112, in accordance with embodiments of the invention. Computing device 110 may include internal and external hardware components, as depicted and described in further detail below with reference to FIG. 4. In other embodiments, computing device 110 may represent a cloud computing environment, as described in relation to FIGS. 7, 8, and 9, below.

In an exemplary embodiment of the invention, GMT program 112 operates generally to receive GUI specifications, or layout files, for both LTR and RTL directions, parse these files to access the GUI elements, and determine whether the positions of RTL GUI elements are correct relative to the corresponding LTR GUI elements. A layout file is generally a text file written in HTML, XHTML, or an XML-based UIML and may reference one or more CSS files. GMT program 112 may include parsing module 114, layout mirroring module 116, and report generation module 118.

Parsing module 114 may receive layout files for both LTR and RTL directions and may initiate the GUI mirroring testing process by establishing a reference direction, for example LTR, and a mirrored direction, for example RTL. This determination may be based, for example, on user input or on the order in which the layout files are received. Alternatively, parsing module 114 may establish the reference direction by querying the text direction property in the DOM for the layout file, or by automatically detecting whether text elements specified in a layout file are predominantly present in an RTL language. This may be done, for example, by comparing samples of text from the text elements with predefined short strings in the RTL languages of interest. In addition, language classification tools, such as the Java Text Categorization Library (JCTL) may be used to guess a reference language and/or a mirrored language.

In an exemplary embodiment of the invention, parsing module 114 operates to receive an LTR layout file and a corresponding RTL layout file. For example, for desktop or mobile apps, parsing module 114 may receive layout files in XML or an XML-based UIML. For web apps, including RIAs, the layout files may contain HTML alone, or HTML with CSS. Parsing module 114 may obtain information from the layout files about LTR GUI elements and their corresponding RTL GUI elements, including positions and dimensions. For example, for web apps, parsing module 114 may employ the HTML DOM to access GUI elements in a JavaScript script. For desktop and mobile apps, parsing module 114 may employ the XML DOM in a JavaScript script, or a query language such as XQuery, to access GUI elements. GUI elements may be identified by an ID, name, or combination of both.

In other embodiments, parsing module 114 may obtain GUI element information from the underlying operating system (OS). This may guarantee that the tested GUI coincides with what a user actually sees, after any processing stages that may occur between parsing and displaying. For example, testing tools such as Inspect and AccScope, which are part of the Windows® Automation API, may provide information from the underlying Windows operating system, such as value, position, layout, visual attributes, and event handles for GUI elements, as displayed. The provided position and size information may then be used in GUI mirroring testing.

Layout mirroring module 116 operates generally to receive position and dimension information from parsing module 114 about LTR GUI elements and their corresponding RTL GUI elements, and test whether GUI elements are correctly mirrored, in accordance with an embodiment of the invention. Testing for correct mirroring includes verifying that each RTL GUI element has substantially the same width as its LTR counterpart, and its displacement relative to the start point of its parent element is substantially the same as the displacement of its RTL counterpart relative to the end point of its parent element. Layout mirroring module 116 may begin by testing all child elements contained within the base window and, for each GUI element tested, layout mirroring module 116 may test its child elements, recursively in a tree style, until the leaves, representing the innermost GUI elements, are reached. Testing ends when all the leaves have been tested.

Layout mirroring module 116 may receive the LTR and RTL GUI element dimension and position information from parsing module 114 in absolute or relative units, as described above. In an embodiment of the invention, if dimensions or positions are in absolute units, layout mirroring module 116 may convert the absolute units to relative units, based on characteristics of display screen 620 (FIG. 6), such as its size and pixel density.

In an exemplary embodiment of the invention, layout mirroring module 116 may receive positions and dimensions for all LTR GUI elements and their child elements from parsing module 114. It is assumed that every GUI element has a parent element unless it is the top level element, typically the base window. As GUI elements may be nested, a GUI element may be a parent element of other GUI elements, as well as a child element of another GUI element. Associated with each GUI element E is a width, W, and, for every child element e of E, an $x_1$-value, or start position, and a width, w, generally in display-independent units. For each GUI element E, layout mirroring module 116 may receive W and, for every child element e of E, w and $x_1$. Layout mirroring module 116 may compute the expected mirrored start position $x'_1$ for every child element e using equation (1):

$$x'_1 = W - (x_1 + w) \qquad (1)$$

Figure 2:
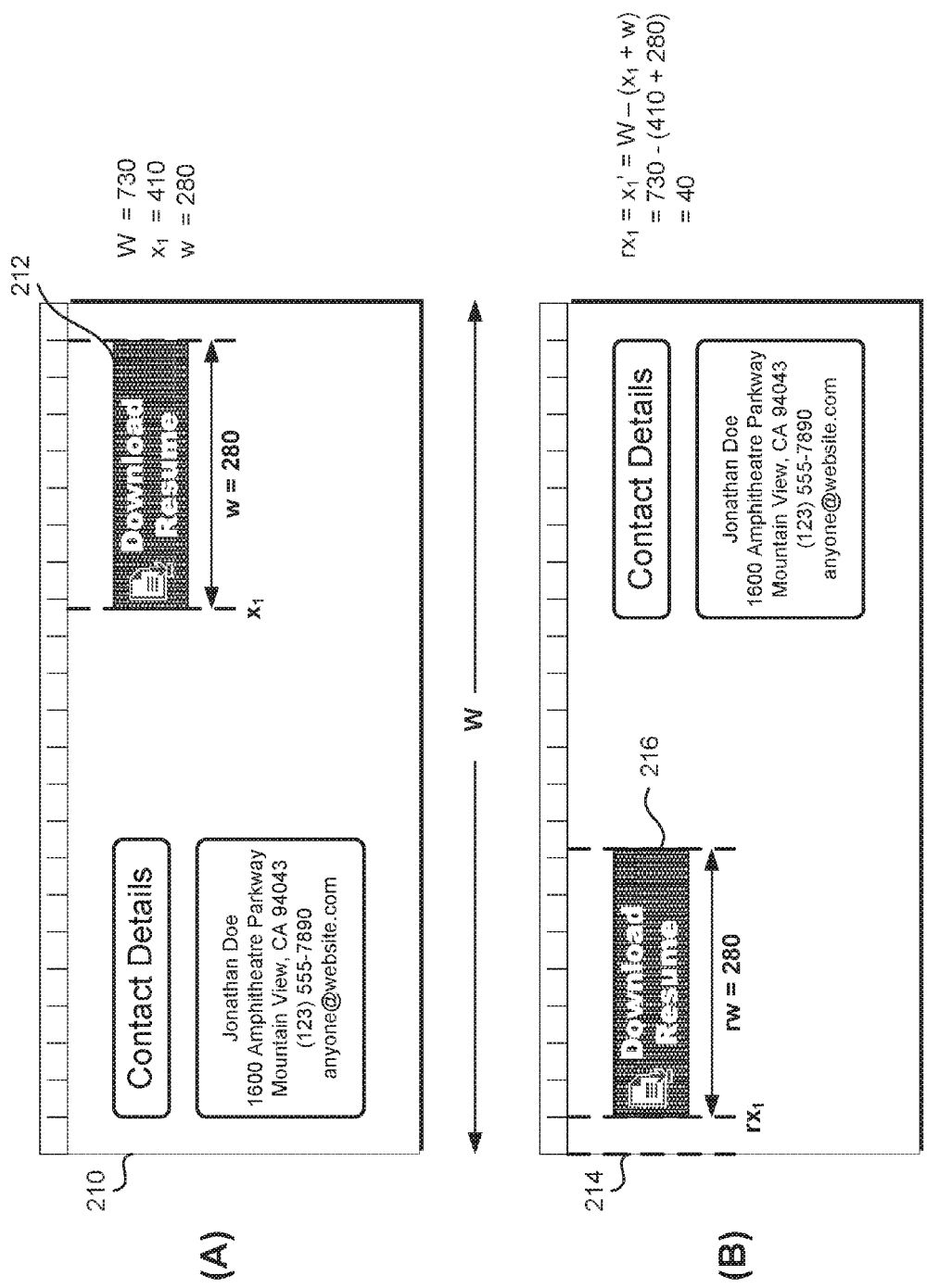
FIGS. 2, 3, and 4 illustrate various aspects of correct and incorrect GUI mirroring.

For each LTR GUI element, layout mirroring module 116 may additionally receive an actual start position $rx_1$ and width rw for a corresponding, i.e., mirrored, RTL GUI element from parsing module 114. For each child element e of E, layout mirroring module 116 may compare the expected start position 4 with the actual start position $rx_1$ and expected width w with the actual width rw of the mirrored GUI element. If $rx_1 = x'_1$ and rw=w, the test passes; otherwise it fails. FIG. 2 illustrates this process in reference to a first GUI in view (A) and its mirrored version in view (B), as described in further detail below.

Layout mirroring module 116 may employ a fault tolerance value, a non-negative value $\epsilon$ such that, for example, the test for a mirrored GUI element passes if the actual start value, $rx_1$, lies between $x'_1 - \epsilon$ and $x'_1 + \epsilon$:

$$W - (x_1 + w) - \epsilon \leq rx_1 \leq W - (x_1 + w) + \epsilon$$

and, similarly, the actual width rw lies between w–$\epsilon$ and w+$\epsilon$. Note that specifying $\epsilon = 0$ is equivalent to requiring equality of $rx_1$ with $x'_1$ and rw with w. For example, a fault tolerance corresponding to 1-3 pixel widths may be advantageous if conversion of positions or dimensions of GUI elements from absolute to relative units may have introduced numerical errors.

In some cases, the OS may cause discrepancies when interpreting RTL language flows. For example, resizing the main window to very small may result in mirrored elements in the resized window being misplaced relative to the original version. By directly using OS information, for example via a testing tool such as Inspect or AccScope, a comparison between overly small windows in the original and mirrored versions may detect such misplacements. In an embodiment of the invention, a systematic or random resizing of the tested GUI may be effected in order to detect incorrect mirroring of GUI elements that may result from resizing the GUI.

Typically, the GUI will have passed routine GUI testing relative to the reference direction before GUI mirroring testing is done. An apparent defect in a mirrored GUI is considered a defect only if the GUI element in question is incorrectly mirrored relative to the reference direction, whether or not the original reference GUI element was correctly placed.

FIG. 2, views (A) and (B) illustrate how the correct placement of mirrored GUI elements may be tested by layout mirroring module 116, in accordance with an embodiment of the invention. In view (A), a GUI element E 210 contains a child element e 212, the Download Resumé button, with width w=280 units and start position $x_1 = 410$ units, representing its placement, for example, relative to the upper left point of the parent element E 210. If E has width W=730 units, then the expected start position for the mirrored version 216 of e may be $rx_1 = W - (x_1 + w) = 40$ units, as shown in view (B).

Figure 3:
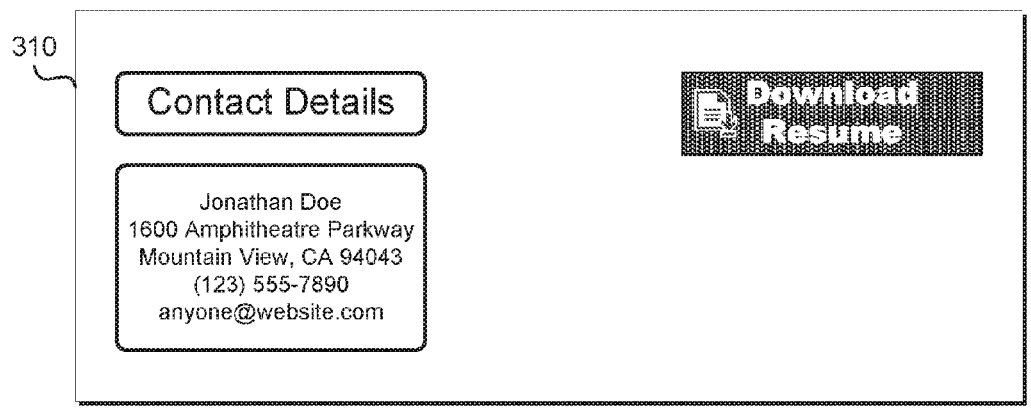
Figure 3:
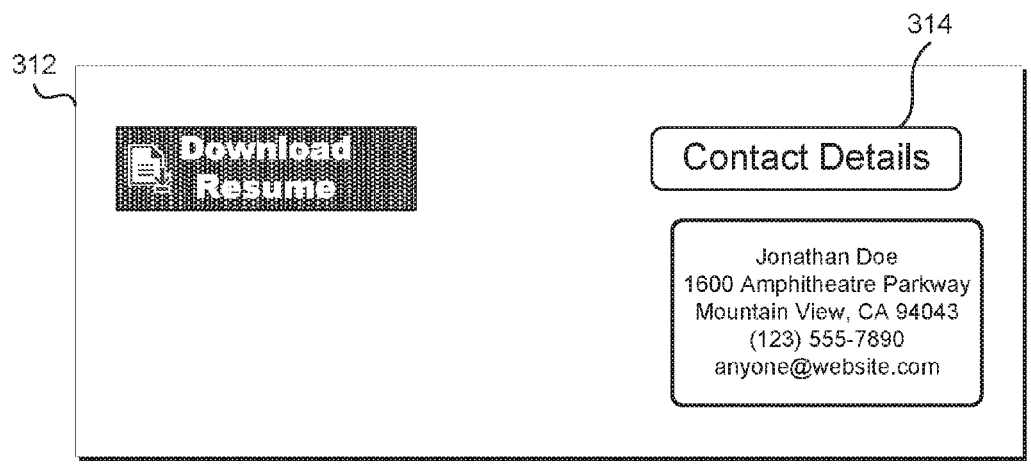
Figure 4:
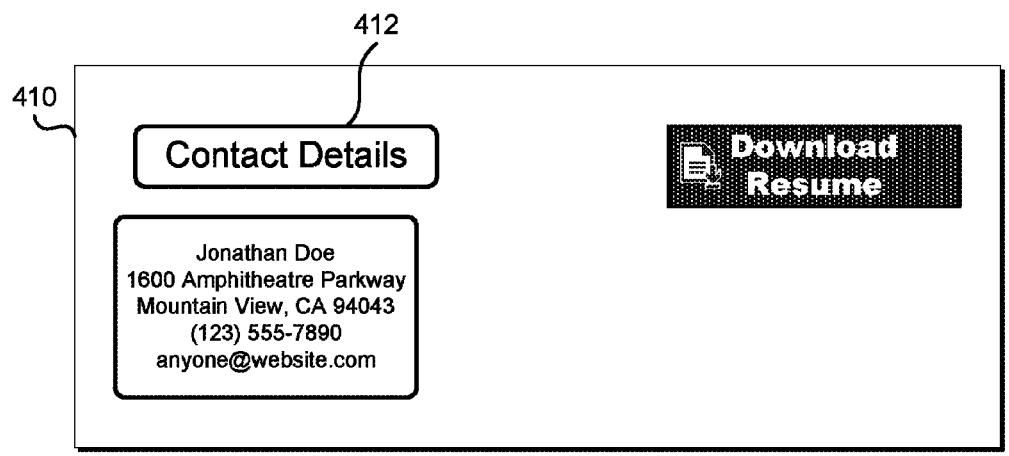
Figure 4:
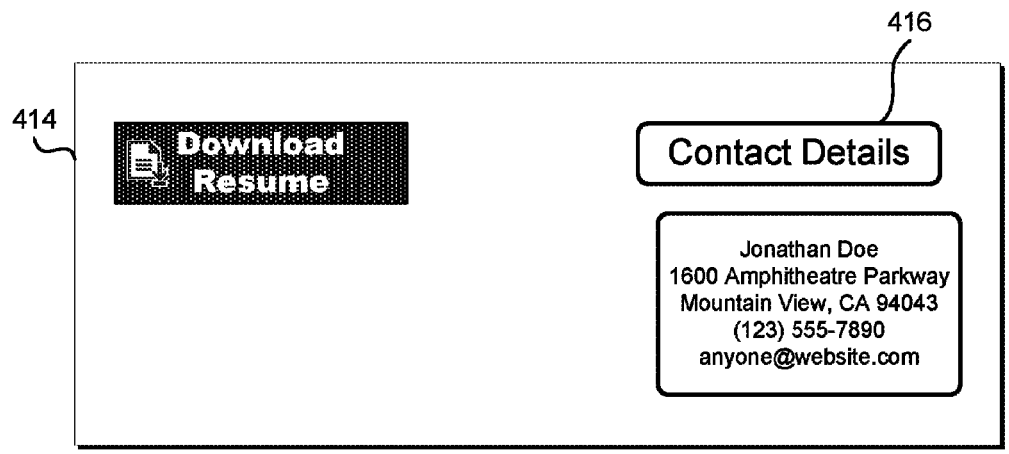

FIGS. 2, 3, and 4 show examples of correct and incorrect GUI mirroring. FIG. 2, view (A) shows a GUI 210 in the reference direction, which is correctly displayed in the mirrored direction 214 in view (B), as described above. In FIG. 3, view (A), the reference direction 310 is correct, but the mirrored direction 312 in view (B) has an error (text box 314 is misplaced). This is considered a mirroring bug. In FIG. 4, view (A), the reference direction 410 and the mirrored direction 414 in view (B) have analogous errors (text boxes 412 and 416 are displaced by the same amount). Layout mirroring module 116 may not consider this a mirroring error, but rather a GUI implementation bug.

In certain embodiments of the invention, layout mirroring module 116 may correct GUI mirroring errors. For example, errors detected by layout mirroring module 116 in a mirrored GUI may be corrected by using the DOM to update the relevant properties of any incorrect GUI elements. Layout mirroring module may then also invoke the GUI rendering engine to display the updated GUI in real time.

Report generation module 118 operates generally to receive from layout mirroring module 116 the results from comparing predicted positions with actual positions of mirrored GUI elements and report any discrepancies, in accordance with an embodiment of the invention. Report generation module 118 may output, for example, a list indicating the GUI elements that successfully passed the mirroring test and another list indicating the GUI elements that failed.

Figure 5:
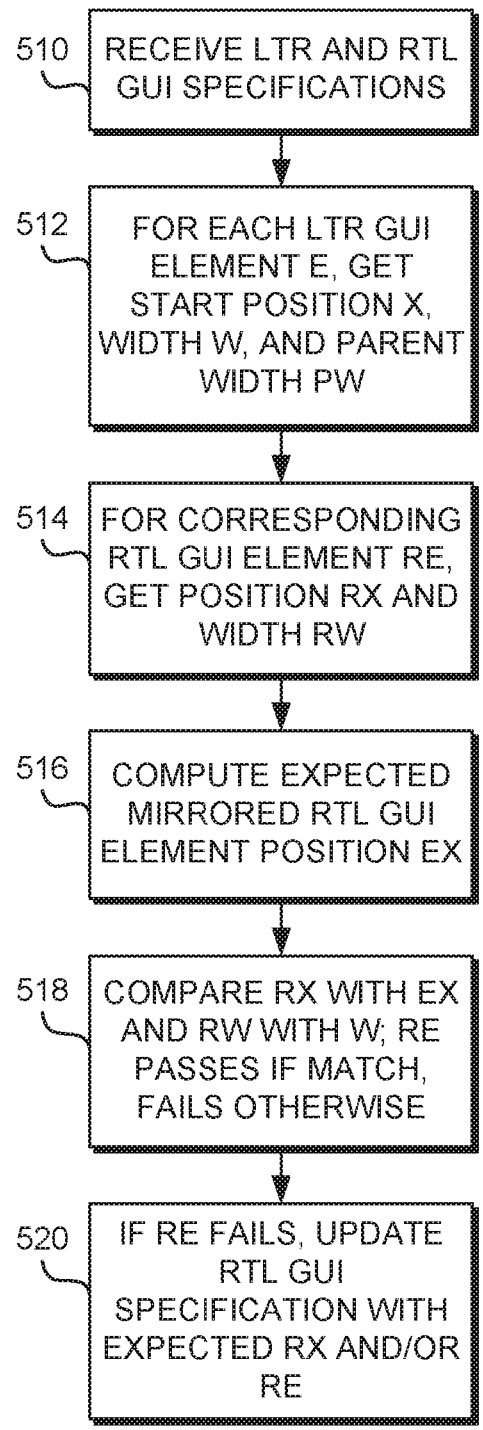
FIG. 5 is a flowchart depicting operational steps of a GMT program, in accordance with an embodiment of the present invention.

FIG. 5 is a flowchart depicting operational steps of GMT program 112, in accordance with an exemplary embodiment of the invention. GMT program 112 may receive GUI specifications for both LTR and RTL versions of a GUI (step 510). Parsing module 114 traverses a tree of all GUI elements in the LTR and RTL versions and, for each child element, retrieves start positions and widths of each LTR GUI element (step 512) and its corresponding RTL GUI element (step 514), as well as the width of the parent GUI element. Layout mirroring module 116 computes an expected position for each LTR GUI element (step 516) and compares the expected position and width with the actual position and width in the RTL GUI. If the expected and actual positions and widths match, the test passes for the GUI element; otherwise, it fails (step 518). If the GUI element fails, layout mirroring module 116 updates the RTL GUI specification with the expected position and width (step 520).

Figure 6:
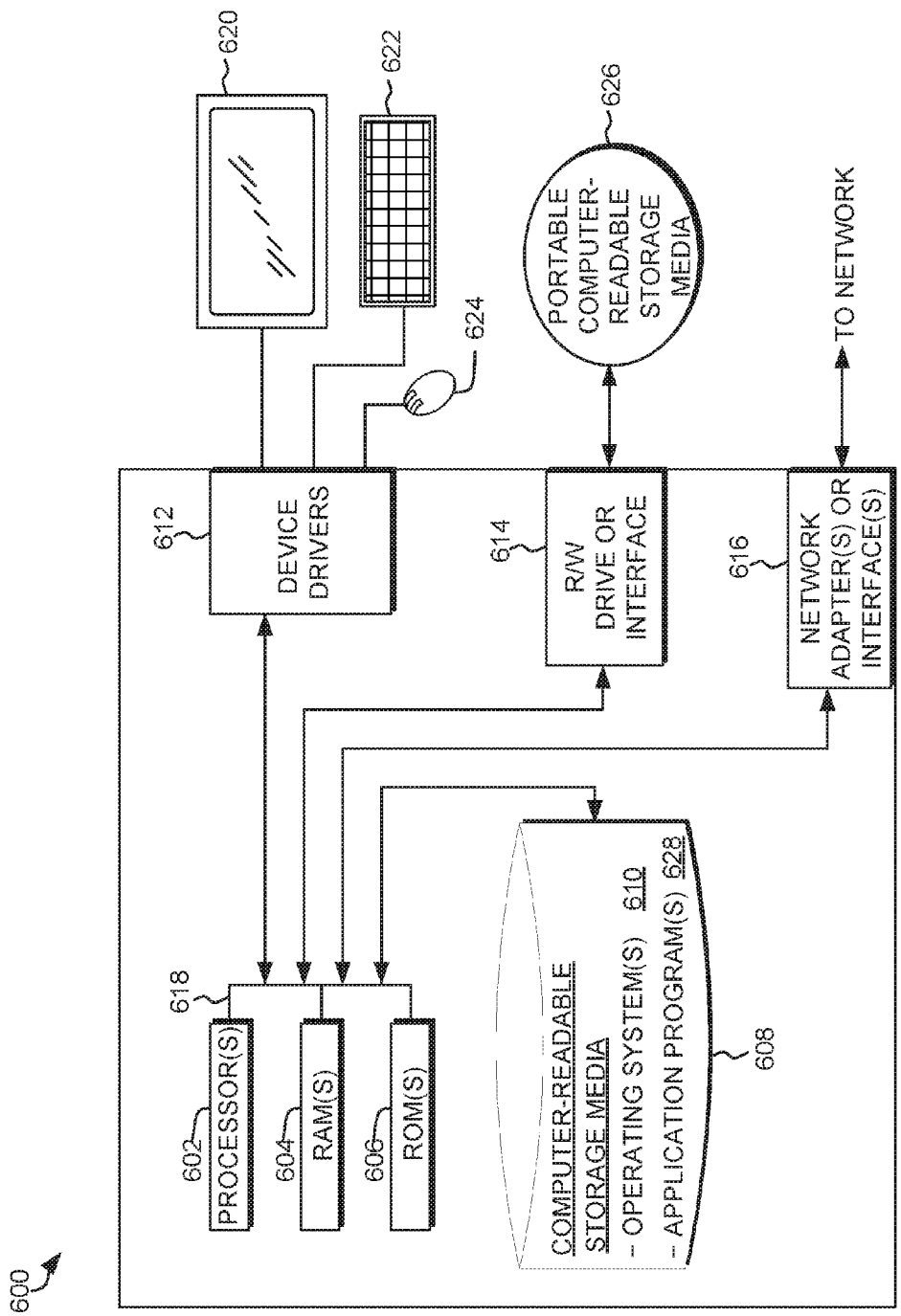
FIG. 6 is a functional block diagram of a data processing environment, in accordance with an embodiment of the present invention.

FIG. 6 depicts a block diagram 600 of components of a computing device 110 (FIG. 1), in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing device 110 may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 628, for example GMT program 112 (FIG. 1), are stored on one or more of the computer readable storage media 608 for execution by one or more of the processors 602 via one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 614 to read from and write to one or more portable computer readable storage media 626. Application programs 628 on computing device 110 may be stored on one or more of the portable computer readable storage media 626, read via the respective R/W drive or interface 614 and loaded into the respective computer readable storage media 608.

Computing device 110 may also include a network adapter or interface 616, such as a TCP/IP adapter card or wireless communication adapter (such as a 4G wireless communication adapter using OFDMA technology). Application programs 628 on computing device 110 may be downloaded to the computing device from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Computing device 110 may also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
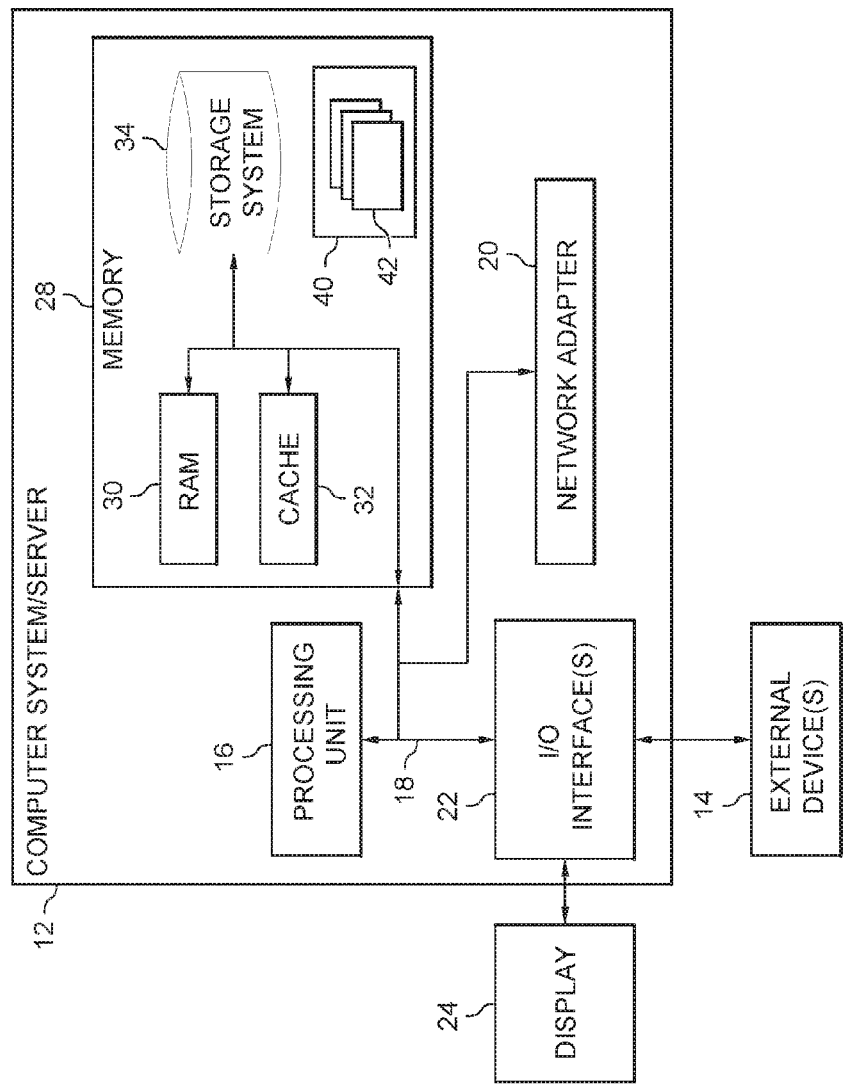
FIG. 7 is a functional block diagram of a cloud computing node according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GMT program 96.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer-implemented method for testing correct mirroring of a graphical user interface (GUI), the method comprising:
   receiving, by a computer, a first GUI specification in a user interface markup language, which includes at least one child GUI element and its parent GUI element, wherein the first GUI specification specifies text elements that are in a left-to-right natural language and which corresponds to a horizontally mirrored counterpart of the first GUI specification, and wherein the second GUI specification is provided in display-independent units;

receiving, by a computer, a second GUI specification in a user interface markup language, which includes a counterpart for each GUI element in the first GUI specification, wherein the second GUI specification specifies text elements that are in a right-to-left natural language and which corresponds to a horizontally mirrored counterpart of the first GUI specification, and wherein the second GUI specification is provided in display-independent units;

for each child GUI element in the first GUI specification:
- determining, by the computer, from the first GUI specification, a start position, a width, and a width of its parent GUI element;
- determining, by the computer, from the second GUI specification, a start position and a width for the counterpart of the child GUI element;
- calculating, by the computer, for the child GUI element, a horizontally mirrored start position, based on its start position, width, and the width of its parent GUI element;
- determining, by the computer, if the start position and width of the counterpart child GUI element are within a predefined tolerance of the calculated horizontally mirrored start position and the width, respectively, of the child GUI element; and
- in response to determining, by the computer, that the start position or the width of the counterpart child GUI element is not within a predefined tolerance of the calculated horizontally mirrored start position or the width, respectively, of the child GUI element, updating the second GUI specification with the calculated horizontally mirrored start position or the width, respectively, of the child GUI element;

rendering, by the computer, on a display device, a horizontally mirrored GUI, according to the second GUI specification;

in response to determining, by the computer, that the calculated horizontally mirrored start position or the width of any child GUI element is not within the predefined tolerance of the start position or the width, respectively, of the counterpart child GUI element, updating the rendered horizontally mirrored GUI, according to the updated second GUI specification; and outputting, by the computer, a report that indicates, for each child GUI element in the first GUI specification, whether the start position and the width of the counterpart child GUI element are within the predefined tolerance of the calculated horizontally mirrored start position and the width, respectively.

\* \* \* \* \*